US012540935B2

United States Patent
Liu et al.

(10) Patent No.: US 12,540,935 B2
(45) Date of Patent: Feb. 3, 2026

(54) WATER QUALITY MONITORING METHOD FOR WATER SUPPLY SYSTEM, WATER SUPPLY SYSTEM, AND REFRIGERATION APPARATUS

(71) Applicants: HEFEI MIDEA REFRIGERATOR CO., LTD., Anhui (CN); HEFEI HUALING CO., LTD., Anhui (CN); MIDEA GROUP CO., LTD., Guangdong (CN)

(72) Inventors: Zanxi Liu, Anhui (CN); Yang Shao, Anhui (CN); Xing Chen, Anhui (CN); Mingxing Sun, Anhui (CN); Jincai Wang, Anhui (CN); Zengqiang Si, Anhui (CN)

(73) Assignees: HEFEI MIDEA REFRIGERATOR CO., LTD., Hefei (CN); HEFEI HUALING CO., LTD., Hefei (CN); MIDEA GROUP CO., LTD., Guangdong (CN)

( * ) Notice: Subject to any disclaimer, the term of this patent is extended or adjusted under 35 U.S.C. 154(b) by 925 days.

(21) Appl. No.: 17/604,348

(22) PCT Filed: Dec. 18, 2019

(86) PCT No.: PCT/CN2019/126186
§ 371 (c)(1),
(2) Date: Oct. 15, 2021

(87) PCT Pub. No.: WO2020/211413
PCT Pub. Date: Oct. 22, 2020

(65) Prior Publication Data
US 2022/0196626 A1    Jun. 23, 2022

(30) Foreign Application Priority Data
Apr. 17, 2019    (CN) .......................... 201910307406.7

(51) Int. Cl.
*G01N 33/18* (2006.01)
*E03B 1/04* (2006.01)
(Continued)

(52) U.S. Cl.
CPC ......... *G01N 33/1826* (2013.01); *E03B 1/048* (2013.01); *E03B 7/045* (2013.01);
(Continued)

(58) Field of Classification Search
CPC .. G01N 33/1826; G01N 33/18; F25D 23/126; F25D 2323/121; F25D 29/00;
(Continued)

(56) References Cited

U.S. PATENT DOCUMENTS

| 5,527,470 | A  |   | 6/1996 | Suda |                    |
|-----------|----|---|--------|------|--------------------|
| 7,216,491 | B2 | * | 5/2007 | Cole | ........... F25C 5/08 |
|           |    |   |        |      | 62/347             |

(Continued)

FOREIGN PATENT DOCUMENTS

| CN | 101362609 A | 2/2009 |
|----|-------------|--------|
| CN | 201386297 Y | 1/2010 |

(Continued)

*Primary Examiner* — William M Mccalister
(74) *Attorney, Agent, or Firm* — K&L Gates LLP (57) ABSTRACT

The present application relates to the technical field of water quality monitoring for water supply systems, and provides a water quality monitoring method for a water supply system, a water supply system, and a refrigeration apparatus. The water quality monitoring method for a water supply system includes: controlling to convey water to a water outlet pipe of the water supply system; obtaining a water quality parameter in the water outlet pipe; judging whether the water quality parameter meets a standard; if the water quality parameter meets the standard, ending the monitoring; if the water quality parameter does not meet the standard, proceeding to a next operation; controlling to drain (Continued)

the water in the water supply system; and repeating the above obtaining operation, judging operation, and draining operation, until the water quality parameter meets the standard. Through this method, the water quality parameter in the water outlet pipe may be monitored in real time, and it is controlled to drain the water in the water supply system when the water quality parameter exceeds the standard, thereby avoiding the breeding and deposition of organic matter. Moreover, this method may avoid drainage and flushing of the water supply system after a long period of inactivity, reduce operational difficulties and improve user convenience.

13 Claims, 6 Drawing Sheets

(51) Int. Cl.
　　　E03B 7/04　　　(2006.01)
　　　E03B 11/16　　(2006.01)
　　　F25B 49/00　　(2006.01)
　　　F25C 1/00　　　(2006.01)
　　　F25D 23/12　　(2006.01)
　　　F25D 29/00　　(2006.01)
　　　G05D 7/06　　　(2006.01)
(52) U.S. Cl.
　　　CPC .............. *E03B 11/16* (2013.01); *F25B 49/00* (2013.01); *F25C 1/00* (2013.01); *F25D 23/126* (2013.01); *F25D 29/00* (2013.01); *G01N 33/18* (2013.01); *G05D 7/0635* (2013.01); *F25C 2400/14* (2013.01); *F25D 2323/121* (2013.01); *G05D 7/0688* (2013.01)
(58) Field of Classification Search
　　　CPC ............... G05D 7/0635; G05D 7/0688; F25C 2400/14; F25C 1/00; E03B 1/048; E03B 7/045; E03B 11/16; F25B 49/00
　　　See application file for complete search history.

(56) References Cited

U.S. PATENT DOCUMENTS

| | | | | |
|---|---|---|---|---|
| 7,310,957 | B2* | 12/2007 | Broadbent | G05B 23/0267 |
| | | | | 236/94 |
| 7,702,236 | B2* | 4/2010 | Steinberg | H04N 25/61 |
| | | | | 396/213 |
| 8,336,327 | B2* | 12/2012 | Cole | F25C 1/246 |
| | | | | 62/344 |
| 8,820,100 | B2* | 9/2014 | Culley | F25C 5/22 |
| | | | | 62/340 |
| 9,032,744 | B2* | 5/2015 | Miller | F25C 5/06 |
| | | | | 62/127 |
| 9,182,162 | B2* | 11/2015 | Culley | F25C 5/22 |
| 10,054,352 | B2* | 8/2018 | Knatt | F25B 47/022 |
| 10,126,034 | B2* | 11/2018 | Cronin | F25C 1/18 |
| 10,323,871 | B2* | 6/2019 | Oh | F25C 1/12 |
| 10,571,181 | B2* | 2/2020 | Cheon | F25C 1/25 |
| 10,808,978 | B2* | 10/2020 | Cheon | G05D 9/12 |
| 10,816,252 | B2* | 10/2020 | Cheon | F25C 1/25 |
| 11,255,593 | B2* | 2/2022 | Junge | F25D 17/02 |
| 2001/0039804 | A1* | 11/2001 | Newman | F25C 1/12 |
| | | | | 62/66 |
| 2003/0010054 | A1* | 1/2003 | Esch | F25C 1/147 |
| | | | | 62/250 |
| 2003/0066788 | A1 | 4/2003 | Wang et al. | |
| 2003/0089120 | A1* | 5/2003 | Kampert | F25C 1/147 |
| | | | | 62/137 |
| 2005/0166612 | A1* | 8/2005 | Allison | F25C 1/00 |
| | | | | 62/137 |
| 2009/0123340 | A1 | 5/2009 | Knudsen et al. | |
| 2022/0196626 | A1* | 6/2022 | Liu | E03B 1/048 |

FOREIGN PATENT DOCUMENTS

| | | |
|---|---|---|
| CN | 202745125 U | 2/2013 |
| CN | 103645753 A | 3/2014 |
| CN | 104359285 A | 2/2015 |
| CN | 105125080 A | 12/2015 |
| CN | 205151974 U | 4/2016 |
| CN | 105911892 A | 8/2016 |
| CN | 106642954 A | 5/2017 |
| CN | 108002470 A | 5/2018 |
| CN | 108411984 A | 8/2018 |
| CN | 208395907 U | 1/2019 |
| CN | 109574281 A | 4/2019 |
| JP | 2003097876 A | 4/2003 |
| KR | 20040057887 A | 7/2004 |

\* cited by examiner

WATER QUALITY MONITORING METHOD FOR WATER SUPPLY SYSTEM, WATER SUPPLY SYSTEM, AND REFRIGERATION APPARATUS

CROSS-REFERENCE TO RELATED APPLICATION

The present application claims priority to Chinese patent application No. 201910307406.7 filed on Apr. 17, 2019, entitled "Water Quality Monitoring Method for Water Supply System, Water Supply System, and Refrigeration Apparatus," the disclosure of which is hereby incorporated by reference in its entirety.

FIELD OF TECHNOLOGY

The present application relates to the technical field of water quality monitoring for water supply systems, in particular to a water quality monitoring method for a water supply system, a water supply system and a refrigeration apparatus.

BACKGROUND

Water supply or provision of cooling water is the basic option for a high-end refrigeration apparatus. However, the disclosed water supply systems for refrigeration apparatus only perform the functions of water filtration, water cooling, water storage and water distribution, but they are powerless to detect water quality. Especially after the water supply system is idle for a long period, the water in a kettle of the water supply system for refrigeration apparatus is provided directly to the user, resulting in poor user experience.

Figure 1:
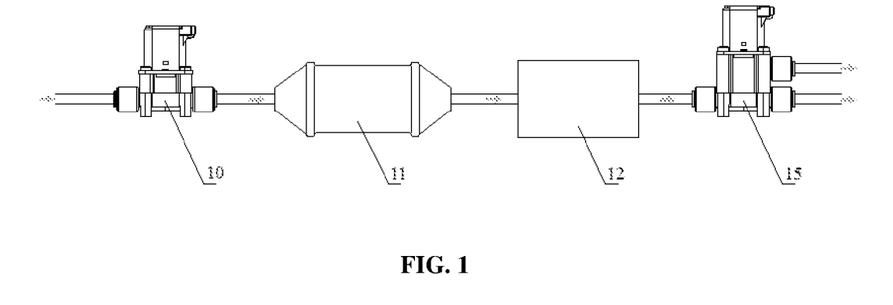
FIG. 1 is a schematic structural diagram of a water supply system according to the prior art.

As shown in FIG. 1, the waterway structure of the traditional water supply system for refrigeration apparatus is as follows:

after a water flow from an external water source passes through a water inlet valve 10, it enters a filter 11 for being filtered, and then is stored in a water container 12. In order to avoid premature deterioration of water quality, the water container 12 is mostly a closed structure. The water division valve 15 mostly has a structure of one inlet and two outlets, one outlet of water is directly supplied to an ice maker, and the other outlet of water is directly supplied to consumers after passing through lines in a box body of the refrigeration apparatus, a door body of the refrigeration apparatus and a dispenser.

The traditional waterway structure is not able to detect the water quality in the kettle. Once the refrigeration apparatus is started, the kettle is always filled with water. When the refrigeration apparatus is idle for a long time, the water in the kettle cannot be discharged, and thus organic matters in the water will breed and deposit on the inner walls of the waterway and the kettle. In order to solve this problem, refrigeration apparatus manufacturers usually require users to drain as much water as possible before the refrigeration apparatus is restarted. However, once the sediment is formed on the inner walls of the waterway and the kettle, it is difficult to remove by a large amount of drainage. Therefore, such method will only bring about a reduction in the concentration of impurities in the kettle and in the lines, and fails to fundamentally solve the problem.

SUMMARY

The present application is intended to address at least one of the technical problems in the prior art or related art.

An objective of the present application is to provide a water quality monitoring method for a water supply system, or a water supply system and a refrigeration apparatus, so as to solve the technical problems in the prior art that the water quality in a water container of the water supply system cannot be detected and organic matters breed and deposit in the water supply system.

In order to achieve the objective, the present application provides a water quality monitoring method for a water supply system, including:
  a water conveying operation controlling to convey water to a water outlet pipe of the water supply system;
  an obtaining operation obtaining a water quality parameter in the water outlet pipe;
  a judging operation judging whether the water quality parameter meets a standard; if the water quality parameter meets the standard, ending the monitoring; if the water quality parameter does not meet the standard, proceeding to a next operation;
  a draining operation controlling to drain the water in the water supply system; and
  repeating the above obtaining operation, judging operation, and draining operation, until the water quality parameter meets the standard.

In an embodiment, before the water conveying operation, the monitoring method further includes:
  obtaining a using water signal, a cleaning signal or a detection signal.

In an embodiment, before the water conveying operation, the water quality monitoring method further includes:
  counting an actual idle time of the water supply system, and performing the water conveying operation when the actual idle time reaches a preset idle time.

In an embodiment, the obtaining operation includes:
  detecting the water quality parameter in the water outlet pipe by a water quality detection device disposed in the water outlet pipe.

In an embodiment, the water quality parameter includes electric ion concentration;
  the judging operation includes:
  comparing an obtained actual electric ion concentration with a preset electric ion concentration, when the actual electric ion concentration is greater than a preset electric ion concentration, judging that the water quality parameter exceeds the standard; and when the actual electric ion concentration is less than or equal to the preset electric ion concentration, judging that the water quality parameter meets the standard.

In an embodiment, between the draining operation and the operation of repeating the above obtaining operation, judging operation and draining operation until the water quality parameter meets the standard, the monitoring method further including:
  detecting a water level of a water container in the water supply system; and
  when the water level of the water container is zero, controlling to inject water into the water supply system and convey the water to the water outlet pipe of the water supply system.

In an embodiment, between the draining operation and the operation of repeating the above obtaining operation, judging operation and draining operation until the water quality parameter meets the standard, the monitoring method further including:
  controlling to inject water into the water supply system so that the water level of the water container of the water supply system is maintained at a preset water level.

In an embodiment, the draining operation includes:
controlling to drain the water in the water supply system until the water in the water supply system is drained completely;
the operation of repeating the above obtaining operation, judging operation and draining operation until the water quality parameter meets the standard includes:
obtaining the water quality parameter in the water outlet pipe;
judging whether the water quality parameter meets the standard; if the water quality parameter meets the standard, ending the monitoring; if the water quality parameter does not meet the standard, proceeding to a next operation; and
controlling to drain the water in the water supply system, and ending the monitoring in the case that the water quality parameter meets the standard before the water in the water supply system is drained completely.

In an embodiment, after the operation of repeating the above obtaining operation, judging operation and draining operation until the water quality parameter meets the standard, the monitoring method further includes:
controlling to inject water into the water supply system until an actual water level of the water container in the water supply system reaches a preset water level.

In an embodiment, the controlling to inject water into the water supply system until an actual water level of the water container in the water supply system reaches a preset water level includes:
detecting the actual water level of the water container in the water supply system, and calculating the water level difference between the actual water level and the preset water level;
calculating a water injection time based on the water level difference; and
opening a water inlet valve of the water supply system to inject water into the water supply system until the duration reaches the water injection time.

In order to achieve the objective, the present application provides a water supply system, including a water container, a water inlet pipe connected to the water container and a water outlet pipe connected to the water container, wherein a water inlet valve is disposed on the water inlet pipe, a drain valve and a water quality detection device are disposed on the water outlet pipe, and the water quality detection device is connected to a controller configured to control the water inlet valve and the drain valve according to a water quality parameter detected by the water quality detection device.

In order to achieve the objective, the present application provides a refrigeration apparatus, including the above-mentioned water supply system, and further including at least one of a water intake switch, a cleaning switch, and a detection switch, the at least one of the water intake switch, the cleaning switch, and the detection switch is configured to send a signal to the controller, and the controller obtains the water quality parameter detected by the water quality detection device based on the signal.

The technical solution of the present application has the following advantages: the water quality parameter in the water outlet pipe may be monitored in real time through the water quality monitoring method for a water supply system according to the present application. Moreover, when the water quality parameter exceeds the standard, the water in the water supply system is controlled to be drained. Therefore, based on the water quality monitoring method for a water supply system, organic matters are prevented from breeding and depositing in the water supply system, and the water quality problem is fundamentally prevented, the safety and sanitation of the water supply system is improved, and the health of customers is ensured. In addition, based on the water quality monitoring method for a water supply system, even if the water supply system is idle for a long time, there is no need for the user to drain and flush the water supply system when it is restarted, which reduces the operational difficulty and improves the convenience of the user.

BRIEF DESCRIPTION OF THE DRAWINGS

In order to more clearly illustrate technical solutions disclosed in the embodiments of the present application or the prior art, the drawings needed in the descriptions of the embodiments or the prior art will be briefly introduced below. Obviously, the drawings in the following description only show certain embodiments of the present application, and other drawings can be obtained according to the drawings without any creative work for those skilled in the art.

REFERENCE NUMERALS

| 1 | wire | 3 | electrode pair |
|---|---|---|---|
| 5 | collar | 8 | sealing ring |
| 9 | installation pipeline | 901 | water inlet pipe section |
| 902 | connecting pipe section | 903 | water outlet pipe section |
| 10 | water inlet valve | 11 | filter |
| 12 | water container | 13 | water quality detection device |
| 14 | drain valve | 15 | water division valve |
| 16 | controller | 17 | water pump |
| 18 | first water outlet pipe | 19 | second water outlet pipe |
| 20 | user interface | | |

DETAILED DESCRIPTION

In order to enable the above objectives, features and advantages of the present application to be more clearly understood, the present application will be further described in detail below in conjunction with the accompanying drawings and specific implementations. It should be noted that the embodiments of the present application or the features in the embodiments may be combined with each other without conflict.

In the description of the present application, it should be noted that unless otherwise specified, the orientations or positional relationships indicated by the terms "center," "longitudinal," "lateral," "upper," "lower," "front," "back," "left," "right," "vertical," "horizontal," "top," "bottom," "inner" and "outer", etc., are based on the orientation or positional relationship shown in the drawings, the purpose of which is only to facilitate describing the present application and simplify the description, rather than to indicate or imply that the device or element referred to must have a specific orientation, be constructed and operated in a specific orientation, and therefore cannot be construed as a limitation to the present application. In addition, the terms "first," "second" and "third" are for the purpose of description only, and cannot be understood as indicating or implying their relative importance.

In the description of the present application, it should be noted that unless otherwise clearly specified or defined, the terms "connect with" and "connect to" should be understood in a broad sense, for example, it can be a fixed connection or a detachable connection, or an integral connection; it can be mechanically connected or electrically connected; or it can be directly connected or indirectly connected through an intermediary. For those of ordinary skill in the art, the specific meaning of the above terms in the present application can be understood according to the specific situations.

According to one of the embodiments of the present application, provided is a water quality monitoring method for a water supply system, including:

Step S1: controlling to convey water to a water outlet pipe of the water supply system.

Step S1 may be summarized as a water conveying operation. Specifically, before the water quality in the water supply system is monitored, the water quality monitoring system of the water supply system is connected to the water supply system. Further, the conveying of water to the water outlet pipe may be controlled based on the water quality monitoring system of the water supply system.

In an embodiment, the conveying of water to the water outlet pipe includes at least the following two cases.

In a first case, a certain amount of water is stored in the water supply system. At this time, it is only necessary to convey the water stored in the water supply system to the water outlet pipe.

In a second case, it is necessary to inject water into the water supply system through an external water source, so that water enters the water outlet pipe. The water source here may be either a water tank that comes with the water supply system, or an external water source, such as a water supply pipe.

Generally, a booster pump/exhaust pressure reducing valve is disposed in the water supply system, and water enters the water outlet pipe under the action of the pressure difference caused by the booster pump/exhaust pressure reducing valve.

The booster pump that is more commonly disposed in the water supply system is a water pump, through which a water flow may be formed inside the water supply system, and the water flow may enter the water outlet pipe.

Step S2: obtaining a water quality parameter in the water outlet pipe.

Step S2 may be summarized as an obtaining operation. There are many methods to obtain the water quality parameter in the lines of the water outlet pipe. In one of these methods, a water quality detection device may be connected in the lines of the water outlet pipe. Further, the water quality parameter in the water outlet pipe is obtained based on the water quality detection device. For the structure of the water quality detection device, several specific embodiments will be given below.

Step S3: judging whether the water quality parameter meets a standard. If the water quality parameter meets the standard, ending the monitoring; if the water quality parameter does not meet the standard, proceeding to a next operation.

Step S3 can be summarized as a judging operation. When the water quality detection device is configured to detect whether the water quality parameter meets the standard, an electrode pair of the water quality detection device contacts the water and obtains an actual electric ion concentration in the water. Further, the obtained actual electric ion concentration is compared with a preset electric ion concentration, and when the actual electric ion concentration is greater than the preset electric ion concentration, it is determined that the water quality parameter exceeds the standard; otherwise, the water quality parameter meets the standard.

The judgment made by the water quality detection device on the actual electric ion concentration is actually a judgment on the resistance value of the water. When the water quality does not meet the standard, there are many impurities in the water, the ion concentration is high, and the resistance value of the water quality detection device is small. Therefore, when the resistance value fed back by the water quality detection device is small, it means that the water quality does not meet the standard at this time. On the contrary, when the water quality meets the standard, the resistance value fed back by the water quality detection device is large. For the judgment of the resistance value, the actual resistance value measured needs to be compared with the preset resistance value.

Of course, water quality parameters include not only electric ion concentration, but also, for example, pH value, suspended solids content and the like. In an embodiment, when the water quality parameter refers to the electric ion concentration, the electrode pair may be used as the water quality detection probe of the water quality detection device.

Step S4: controlling to drain the water in the water supply system.

Step S4 can be summarized as a draining operation. The water outlet pipe is washed by the water flow by draining the water in the water supply system. It is not required to completely drain the water in the current water supply system. For example, the reason why the water quality parameter detected is unqualified may also be the accumulation of impurities at the water outlet pipe. In this case, it may only need to flush the water outlet pipe for a certain period of time to make the subsequent water quality parameters in the water outlet pipe meet the standard. Of course, it is also possible that after the water currently stored in the water supply system is completely drained, the water quality parameter of the water outlet pipe still does not meet the standard, and at this time, water needs to be reinjected into the water supply system.

That is, in order to ensure that there is always water flow in the water outlet pipe during the monitoring process of water quality in the water supply system, it is necessary to inject water into the water supply system when the water level of the water container of the water supply system is zero or close to zero.

Specifically, between step S4, i.e., controlling to drain the water in the water supply system and step S5, i.e., repeating the above obtaining operation, judging operation and draining operation until the water quality parameter meets the standard, the monitoring method further includes:

detecting a water level of a water container in the water supply system; and when the water level of the water container is zero, controlling to inject water into the water supply system and convey the water to the water outlet pipe of the water supply system.

It is worth mentioning that, the "detecting a water level of a water container in the water supply system; and when the water level of the water container is zero, controlling to inject water into the water supply system and convey the water to the water outlet pipe of the water supply system" occurs between step S4 and step S5, including two following scenarios.

In a first scenario, the "detecting a water level of a water container in the water supply system; and when the water level of the water container is zero, controlling to inject water into the water supply system and convey the water to the water outlet pipe of the water supply system" occurs after step S4 and before step S5.

In a second scenario, the "detecting a water level of a water container in the water supply system; and when the water level of the water container is zero, controlling to inject water into the water supply system and convey the water to the water outlet pipe of the water supply system" occurs simultaneously with step S4.

Specifically, when the water level of the water container is zero or close to zero, the drain valve of the water supply system and the booster pump/exhaust pressure reducing valve of the water supply system are first closed. Then, the inlet valve of the water supply system is opened to inject water into the water supply system, and after the inlet valve is opened, the booster pump/exhaust pressure reducing valve of the water supply system is opened to convey the water to the water outlet pipe.

It should be noted that when the water level of the water container is zero, it means that there is no water flow in the water supply system. At this time, if the booster pump/exhaust pressure reducing valve of the water supply system is kept open, it will cause damage to the booster pump/exhaust pressure reducing valve of the water supply system. Therefore, before injecting water into the water supply system, the booster pump/exhaust pressure reducing valve needs to be closed in advance.

Moreover, in this case, drainage and water injection are two independent processes. Further, when the water quality parameter exceeds the standard, the water in the current water supply system is first drained (unless the water quality parameter has reached the standard before draining), and then the water is injected again, thus the water quality may be better improved.

Of course, it is also possible to inject water into the water supply system while performing step S4, i.e., controlling to drain the water in the water supply system, so that the water level of the water container of the water supply system is maintained at a preset water level.

That is, between step S4, i.e., controlling to drain the water in the water supply system and step S5, i.e., repeating the above obtaining operation, judging operation and draining operation until the water quality parameter meets the standard, the monitoring method further includes:

controlling to inject water into the water supply system so that the water level of the water container of the water supply system is maintained at a preset water level.

Specifically, it is possible to control the water inlet valve of the water supply system to be opened so as to inject water into the water supply system while controlling the drain valve in the water supply system to be opened so as to drain water to the outside.

In this case, as long as the water supply system drains outwards, water is injected into the water supply system at the same time. There is no obvious time interval between draining and injecting water, which may improve the efficiency of water quality control. Moreover, in this case, the control is simple, and there is no need to intervene in the monitoring of the water level, and the operability and accuracy of the monitoring method may be improved.

S5, repeating the above obtaining operation, judging operation and draining operation until the water quality parameter meets the standard.

The obtaining operation is the "obtaining a water quality parameter in the water outlet pipe" corresponding to step S2. The judging operation is the "judging whether the water quality parameter meets a standard; if the water quality parameter meets the standard, ending the monitoring; if the water quality parameter does not meet the standard, proceeding to a next operation" corresponding to step S3. The draining operation is the "controlling to drain the water in the water supply system" corresponding to step S4.

The water quality parameter in the water outlet pipe may be monitored in real time through this water quality monitoring method for a water supply system. Moreover, when the water quality parameter exceeds the standard, the water in the water supply system is controlled to be drained. Therefore, based on the water quality monitoring method for a water supply system, organic matters are prevented from breeding and depositing in the water supply system, and the water quality problem is fundamentally prevented, the safety and sanitation of the water supply system is improved, and the health of customers is ensured. In addition, based on the water quality monitoring method for a water supply system, even if the water supply system is idle for a long time, there is no need for the user to drain and flush the water supply system when it is restarted, which reduces the operational difficulty and improves the convenience of the user.

It is worth mentioning that through the above-mentioned water quality monitoring method for a water supply system, the water in the water supply system may be completely drained from the water supply system at the first controlled drainage. In order to completely drain the water in the water supply system, it is preferred to close the water inlet valve of the water supply system during the first controlled drainage. When the draining process is repeated later, there is no need to completely drain the water in the water supply system, and as long as the water quality parameter meets the standard, the drainage may be stopped. Further, in the subsequent draining process, the water inlet valve may either be opened or closed.

That is, in step S4, namely the step of controlling to drain the water in the water supply system further includes:

controlling to drain the water in the water supply system until the water is drained completely from the water supply system.

In step S5, namely the step of repeating the above obtaining operation, judging operation and draining operation until the water quality parameter meets the standard includes:

obtaining the water quality parameter in the water outlet pipe;

judging whether the water quality parameter meets the standard; if the water quality parameter meets the standard, ending the monitoring; if the water quality parameter does not meet the standard, proceeding to a next operation; and controlling to drain the water in the water supply system, and ending monitoring in the case that the water quality parameter meets the standard before the water in the water supply system is drained completely.

That is, repeating the draining process does not require the same degree of drainage in each draining process. It only need to be able to flush the water supply system through drainage, so as to achieve the effect of improving the water quality of the water supply system.

The monitoring system of the water supply system used in the above-mentioned water quality monitoring method for a water supply system may be disposed either in the water supply system or in the products equipped with the above-mentioned water supply system. For example, the above-mentioned water supply system may be disposed in the refrigeration apparatus. Further, when the refrigeration apparatus is a refrigerator, the monitoring system of the above-mentioned water supply system may be arranged in the refrigerator.

According to one of the embodiments of the present application, before step S1 of controlling to convey water to a water outlet pipe of the water supply system, the water quality monitoring method for a water supply system further includes:

obtaining a using water signal, a cleaning signal or a detection signal.

Therefore, such a water quality monitoring method for a water supply system may be started based on a using water signal, based on a cleaning signal, or based on a detection signal only. As a result, even when no water is needed, the water quality in the water supply system may be monitored to avoid the deterioration of the water quality caused by breeding and deposition of organic matters in the water supply system due to a long period of inactivity.

Of course, in addition to triggering step S1 based on the above using water signal, cleaning signal or detection signal, it is also possible to perform the following step before step S1 of controlling to convey water to a water outlet pipe of the water supply system:

counting an actual idle time of the water supply system, until the actual idle time reaches a preset idle time.

Further, when the water supply system is idle for too long, the refrigeration apparatus equipped with the water supply system may automatically send out a detection signal and monitor the water quality of the water supply system based on the detection signal to prevent organic matters from breeding and depositing in the water supply system.

Wherein for the counting of the idle time of the water supply system, it can be cleared when the water flow in the water supply system begins flowing, and timing is started when the water flow is no longer flowing.

Taking a water supply system of a refrigerator as an example, when water flows in the water supply system of the refrigerator, it can be preliminarily determined that the water supply system of the refrigerator is in a using or maintenance state, rather than an idle state. Alternatively, it also can be cleared when the booster pump/exhaust pressure reducing valve in the refrigerator water supply system begins working, and timing is started from the end of the work of the booster pump/exhaust pressure reducing valve. Alternatively, it also can be cleared when the drain valve (i.e. the valve used to supply water to the user, or the valve used to provide water to the inside of the refrigerator; the existing water supply system of refrigerator is often connected to a water division valve, which will be mentioned later) of the water supply system of the refrigerator is opened, and timing is started when the drain valve is closed. Of course, the method for counting the idle time of the water supply system of a refrigerator is not limited by the example here.

According to one of the embodiments of the present application, after step S5 of repeating the above obtaining operation, judging operation and draining operation until the water quality parameter meets the standard, the monitoring method further includes:

controlling to inject water into the water supply system until an actual water level of the water container in the water supply system reaches a preset water level.

Specifically, it is possible to inject water into the water supply system by controlling the opening of the water inlet valve of the water supply system.

When the water quality parameter meets the standard, the water supply system may be in a water shortage state at this time, that is, the actual water level has not reached the preset water level, and thus water may be injected into the water supply system.

Wherein the controlling to inject water into the water supply system until an actual water level of the water container in the water supply system reaches a preset water level includes:

detecting the actual water level of the water container in the water supply system, and calculating the water level difference between the actual water level and the preset water level;

calculating a water injection time based on the water level difference; and opening the water inlet valve of the water supply system to inject water into the water supply system until the duration reaches the water injection time.

Figure 2:
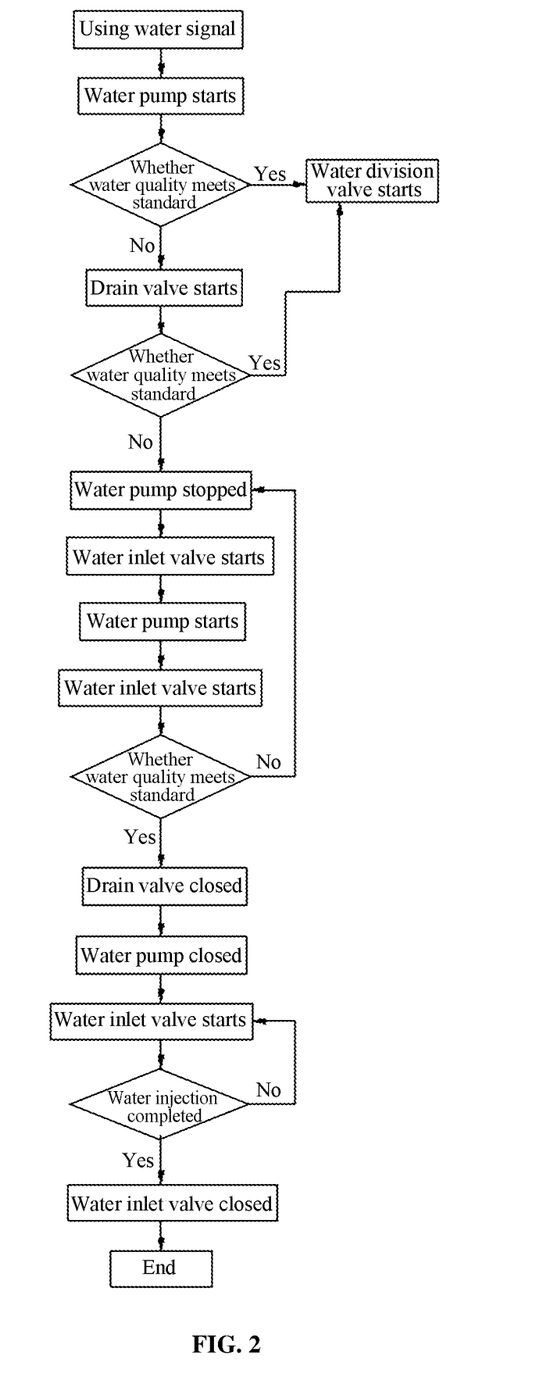
FIG. 2 is a schematic flow chart of a water quality monitoring method for a water supply system according to an embodiment of the present application.

According to one of the embodiments of the present application, the provided water quality monitoring method for a water supply system is shown in FIG. 2.

Figure 3:
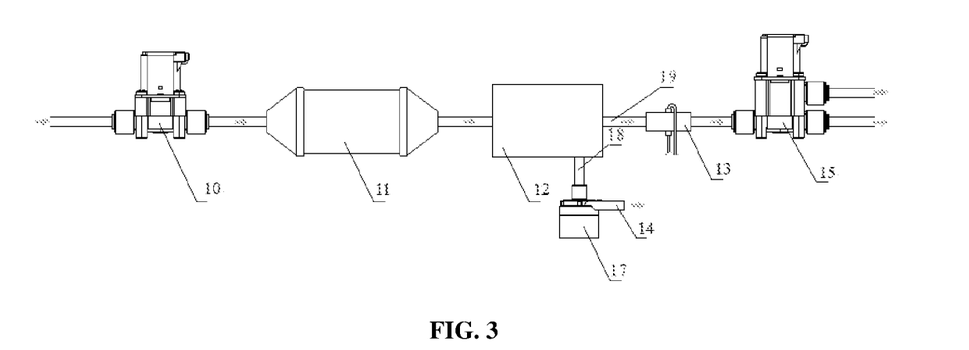
FIG. 3 is a schematic diagram of the installation of a water quality detection device inside a water supply system according to an embodiment of the present application.
Figure 4:
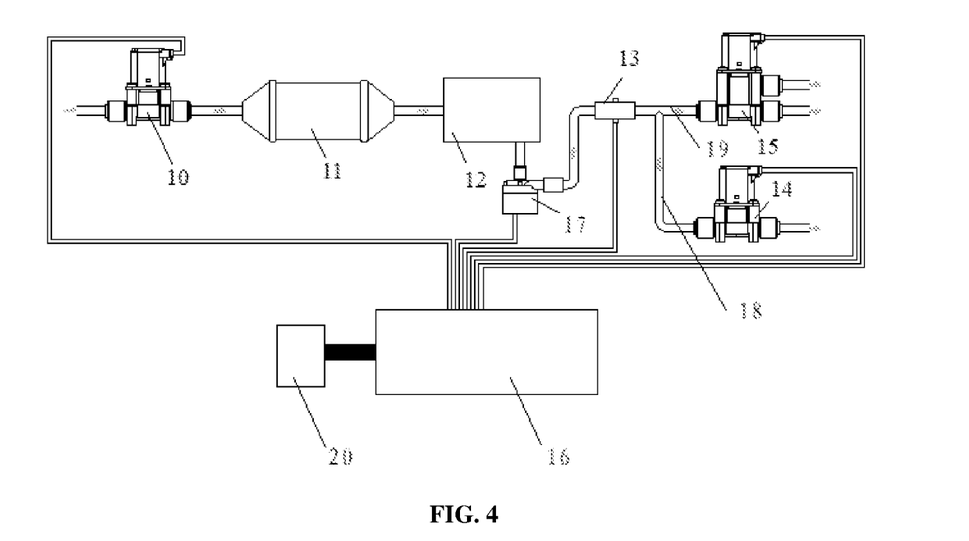
FIG. 4 is a schematic diagram of the installation structure of a water quality detector and a controller inside a water supply system according to an embodiment of the present application.

In addition, according to one of the embodiments of the present application, as shown in FIGS. 3 and 4, a water supply system is provided, which includes a water container 12 and a water outlet pipe connected to the water container 12, wherein a water quality detection device 13 and a drain valve 14 are disposed on the water outlet pipe. The water supply system also includes a controller 16, the water quality detection device 13 is configured to obtain a water quality parameter in the water outlet pipe and send it to the controller 16, and the controller 16 controls the drain valve 14 according to the water quality parameter and controls the drain valve to be opened when the water quality parameter exceeds the standard.

In the water supply system, a water quality detection device is provided on the water outlet pipe of the water container, so that the water quality of the water supply system may be detected. Furthermore, the water supply system also includes a drain valve, so that once the water quality is detected as unqualified, the water supply system will control the drain valve to drain water based on the detection result, which prevents organic matters from breeding and depositing in the water supply system, thereby fundamentally preventing the occurrence of water quality problems, improving the safety and sanitation of the water supply system, and ensuring the health of customers. Moreover, even if the water supply system is idle for a long time, it does not require the user to flush the water supply system when it is restarted, which reduces the operational difficulty and improves the convenience of the user.

As can be found in FIGS. 3 and 4, the water supply system also includes a water inlet pipe of the water container 12. A water inlet valve 10 is disposed in the water inlet pipe, and the connection/disconnection between the entire water supply system and the water source may be controlled through the water inlet valve 10. The type of the water inlet valve 10 is not limited, for example, it may be an electric control valve, a magnetic control valve, a mechanical valve, and the like.

In addition, a filter 11 may be provided in the water supply system to filter the water in the water supply system in order to obtain water quality that meets the needs of users. The filter 11 may be disposed anywhere in the water supply system, but to avoid impurities entering and depositing in the water container 12, the filter 11 is preferably disposed in the water inlet line, so that the water entering the water container 12 is water that meets the needs of the user, and the accumulation and deposition of organic matters in the water container 12 may be avoided.

In addition, as can be found in FIGS. 3 and 4, a water division valve 15 is also provided on the water outlet pipe. When the water supply system is a water supply system of refrigerator, a first outlet of the water division valve 15 is connected to an ice maker of the refrigerator, and a second outlet is connected to a dispenser on a door body of the water supply system of the refrigerator. Wherein the water division valve 15 is provided so that the user may use the water provided by the water supply system of the refrigerator to make ice, or may directly obtain drinking water through the dispenser. Of course, the application of water supply for the water container 12 of the water supply system of refrigerator is not limited by the examples given here, but can also be used for any other purpose.

In an embodiment, when the water division valve 15 is provided on the water outlet pipe, the water division valve 15 and the drain valve 14 may be arranged in parallel. As shown in FIGS. 3 and 4, the water outlet pipe includes a first water outlet pipe 18 and a second water outlet pipe 19. The drain valve 14 is disposed on the first water outlet pipe 18, and the water division valve 15 is disposed on the second water outlet pipe 19. In FIG. 3, the water quality detection device 13 is disposed on the second water outlet pipe 19; and in FIG. 4, the water quality detection device 13 is disposed on a common water inlet pipe of the first water outlet pipe 18 and the second water outlet pipe 19. Of course, the examples in FIGS. 3 and 4 are not regarded as a restriction on the location of the water quality detection device 13.

As shown FIG. 3, a water pump 17 is installed on the first water outlet pipe 18, and then the water pump 17 is configured to realize the pumping and delivery of water in the water supply system. In FIG. 4, the water pump 17 is installed on a common water inlet pipe of the first water outlet pipe 18 and the second water outlet pipe 19. Of course, the installation location of the water pump 17 is not limited but can be anywhere in the water supply system.

Moreover, in addition to the water pump 17, any supercharging device or negative pressure device disclosed in the prior art may also be employed as a substitute. For example, an exhaust pressure reducing valve may also be disposed at the position of current pumps in FIGS. 3 and 4, and the water in the water supply system may be drained by forming a negative pressure at the exhaust pressure reducing valve.

The water container 12 in the water supply system may be a kettle. In this way, the purpose of the water quality detection device 13 is to detect whether the water quality in the kettle meets the requirements.

In addition, as can be found in FIG. 4, the controller 16 is connected to a user interface 20, and thus it is possible to display the status of the water supply system and receive external instructions based on the user interface 20.

According to one of the embodiments of the present application, the water quality detection device includes an installation pipeline and a water quality detection probe, the installation pipeline is connected in the lines, and the water quality detection probe is installed on the installation pipeline and extends into the installation pipeline. The installation pipeline includes a water inlet pipe section, a water outlet pipe section and a connecting pipe section which connects the water inlet pipe section and the water outlet pipe section. The following requirements are met between the water inlet pipe section and the connecting pipe section: the flow rate in the connecting pipe section is greater than that in the water inlet pipe section when water flow is introduced into the installation pipe. The water quality detection probe is installed on the connecting pipe section and extends into the connecting pipe section.

Several different water quality detection devices are provided below through different embodiments respectively.

Embodiment 1

Figure 5:
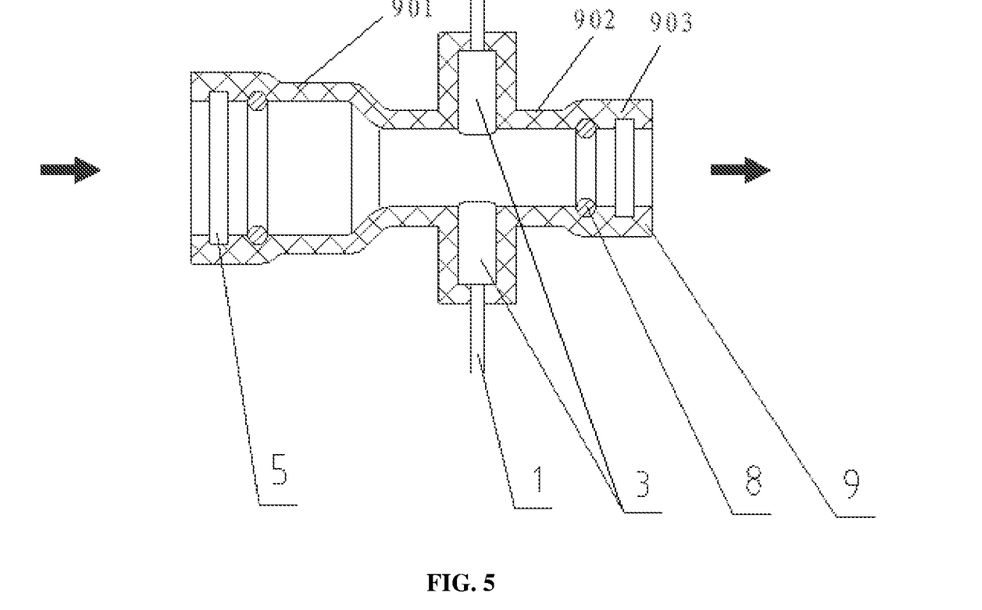
FIG. 5 is a schematic structural diagram of a water quality detection device according to Embodiment 1 of the present application.

As shown in FIG. 5, the water quality detection device according to Embodiment 1 includes an installation pipeline 9 and a water quality detection probe. The installation pipeline 9 includes a water inlet pipe section 901, a water outlet pipe section 903, and a connecting pipe section 902 which connects the water inlet pipe section 901 and the water outlet pipe section 903. The cross-sectional area of the water inlet pipe section 901 is larger than that of the connecting pipe section 902. The water quality detection probe is installed on the connecting pipe section and extends into the connecting pipe section.

This type of water quality detection device is connected in the lines through the installation pipeline 9 instead of being combined with the water container. While leakage is prone to occur at the junction of the traditional water quality detection device and the water container, the combination between this type of water quality detection device with the water container is avoided, thereby avoiding leakage at the junction. In addition, in this type of water quality detection device, since the cross-sectional area of the water inlet pipe section is larger than that of the connecting pipe section, the flow rate in the connecting pipe section is greater than that in the water inlet pipe section, and the water flow in the connecting pipe section is accelerated locally, so that the water quality detection probe extending into the connecting pipe section is washed by the water flow, avoiding impurity deposits on the surface of the water quality detecting probe, and improving the detection accuracy of the water quality detection device. In addition, since the water quality detection probe is not affected by the accumulation of impurities, the service life of the water quality detection device may be prolonged.

The "extends into the connecting pipe section" in "the water quality detection probe is installed on the connecting pipe section and extends into the connecting pipe section" refers to all situations where the water quality detection probe may contact the liquid inside the connecting pipe section, including the case where the end of the water quality detection probe is flush with the inner wall of the connecting pipe section, and also the case where the end of the water quality detecting probe protrudes relative to the inner wall of the connecting pipe section.

As shown in FIG. 5, the water quality detection probe is an electrode pair 3, which is arranged coaxially. In this case, both electrodes are subjected to the same flushing, which in turn prevents one electrode from being upstream, which can be more easily damaged.

In FIG. 5, the electrode pair 3 is connected in the circuit through wires 1.

It is also found from FIG. 5 that the connecting pipe section partially protrudes outwardly to form mounting recesses for the electrode pair 3. The electrode pair 3 is installed in the mounting recesses, wherein the electrode pair 3 includes a positive electrode and a negative electrode, and the number of the mounting recesses is two and configured to mount the positive electrode and the negative electrode, respectively. In this case, the electrode pair 3 is installed reliably, and is almost unaffected by water flow, through which the service life of the water quality detection device may be prolonged.

In addition, in FIG. 5, an end of the positive electrode and an end of the negative electrode of the electrode pair 3 protrude relative to the inner wall of the connecting pipe section, which may ensure that the electrode pair 3 is in full contact with the water flow to accurately detect the water quality. Of course, the end of the positive electrode and the end of the negative electrode of the electrode pair 3 may also be flush with the inner wall of the connecting pipe section, so as to prevent the water flow from washing the electrode pair 3 and ensure the service life of the water quality detection device.

In FIG. 5, the inner wall of the water inlet pipe section and the inner wall of the water outlet pipe section are respectively provided with a first groove and a second groove. A collar 5 is fixed in the first groove, and a sealing ring 8 is fixed in the second groove. Furthermore, by providing the collar 5 and the sealing ring 8, a sealed connection between the installation pipeline 9 and the lines is achieved. The role of the collar 5 is mainly to tightly lock the installation pipeline 9 and the lines, and the role of the sealing ring 8 is mainly to provide a seal between the installation pipeline 9 and the lines, thereby preventing water leakage.

According to Embodiment 1 of the present application, the first groove is located on a side of the second groove away from the connecting pipe section. In this case, relative to the installation pipeline 9, the first groove is located outside the second groove, that is, the collar 5 is located outside the sealing ring 8, so that the sealing effect of the sealing ring 8 may be better ensured. In an embodiment, when the cross-sections of the water inlet pipe section and the water outlet pipe section are circular (ignoring the wall thickness of the water inlet pipe section and the water outlet pipe section), the sealing ring 8 may be an O-shaped sealing ring.

In addition to the above-mentioned collar 5 and sealing ring 8 for sealing connection between the installation pipeline 9 and the lines, other clamping methods, threaded connection methods, welding methods, bonding methods or the like may also be used for connection. For example, when other clamping methods are adopted, the installation pipeline 9 and the pipe section that matches the installation pipeline 9 in the lines can be clamped by a clamp. For another example, when the threaded connection is adopted, an end of the water inlet pipe section and an end of the water outlet pipe section are provided with internal/external threads, and the lines are provided with external/internal threads that are matched therewith.

Embodiment 2

Figure 6:
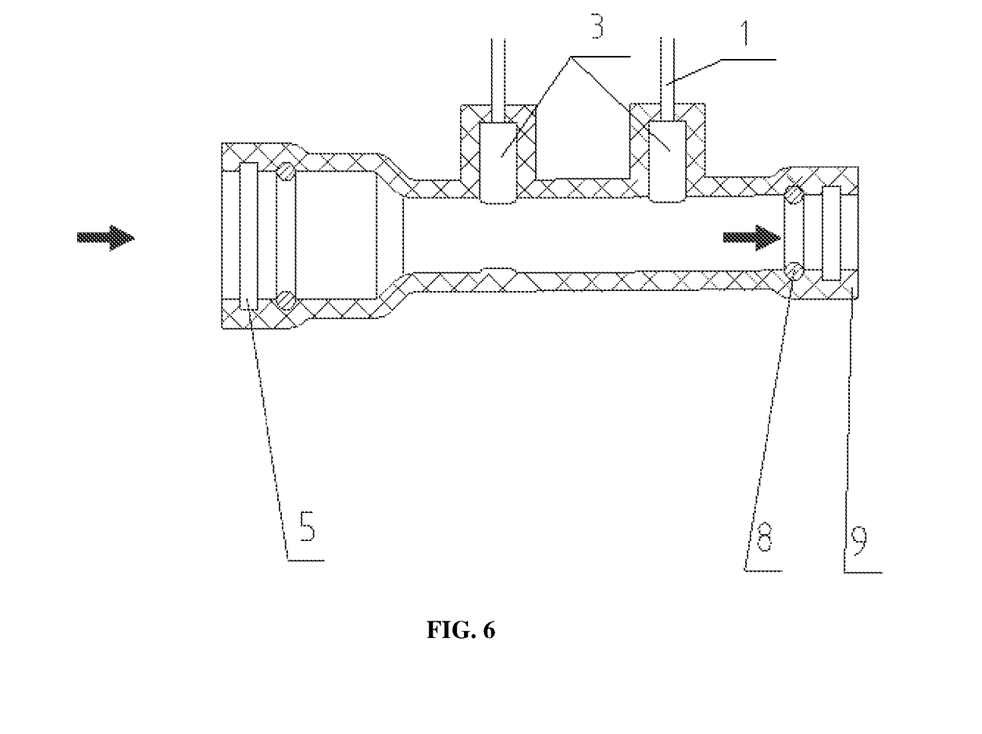
FIG. 6 is a schematic structural diagram of a water quality detection device according to Embodiment 2 of the present application.

As shown in FIG. 6, the difference between Embodiment 2 and Embodiment 1 is that in Embodiment 2, the electrode pair 3 is arranged on the same side of the connecting pipe section. In this case, the positive electrode and the negative electrode are connected to the external circuit from the same side, thereby facilitating the setting of the external circuit.

In one case, the positive electrode and the negative electrode of the electrode pair 3 are arranged in parallel, and the wires 1 are connected from the same side of the connecting pipe section. In this case, the structure of the connecting pipe section is more regular, thus facilitating preparation.

Embodiment 3

Figure 7:
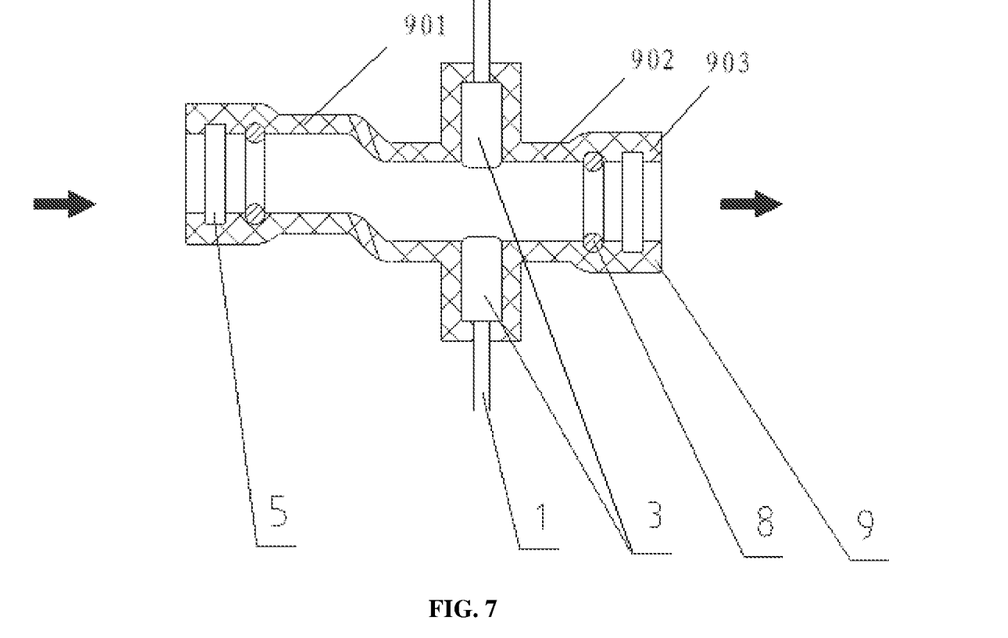
FIG. 7 is a schematic structural diagram of a water quality detection device according to Embodiment 3 of the present application.

The similarities with Embodiment 1 will not be repeated in Embodiment 3. The difference between Embodiment 3 and Embodiment 1 is that in Embodiment 3, as shown in FIG. 7, in order to make the flow rate in the connecting pipe section 902 greater than that in the water inlet pipe section 901 when the water flow is introduced into the installation pipeline 9, the water inlet pipe section 901 and the connecting pipe section 902 extend along different axes, and the water inlet pipe section 901 and the connecting pipe section 902 meet the following requirements: when the water flow is introduced into the installation pipeline 9, the gravitational potential energy of the water in the water inlet pipe section is greater than that of the water in the connecting pipe section. Here, "the gravitational potential energy of the water in the water inlet pipe section is greater than that of the water in the connecting pipe section" is for the same molar amount of water.

Therefore, in FIG. 7, when the water flows from the water inlet pipe section to the connecting pipe section, part of the gravitational potential energy of the water is converted into the kinetic energy of the water, which in turn increases the speed of the water flow in the connecting pipe section, and the water quality detection probe extending into the connecting pipe section is washed by the water flow, so as to avoid impurity deposits on the surface of the water quality detection probe, improving the detection accuracy of the water quality detection device.

Embodiment 4

Figure 8:
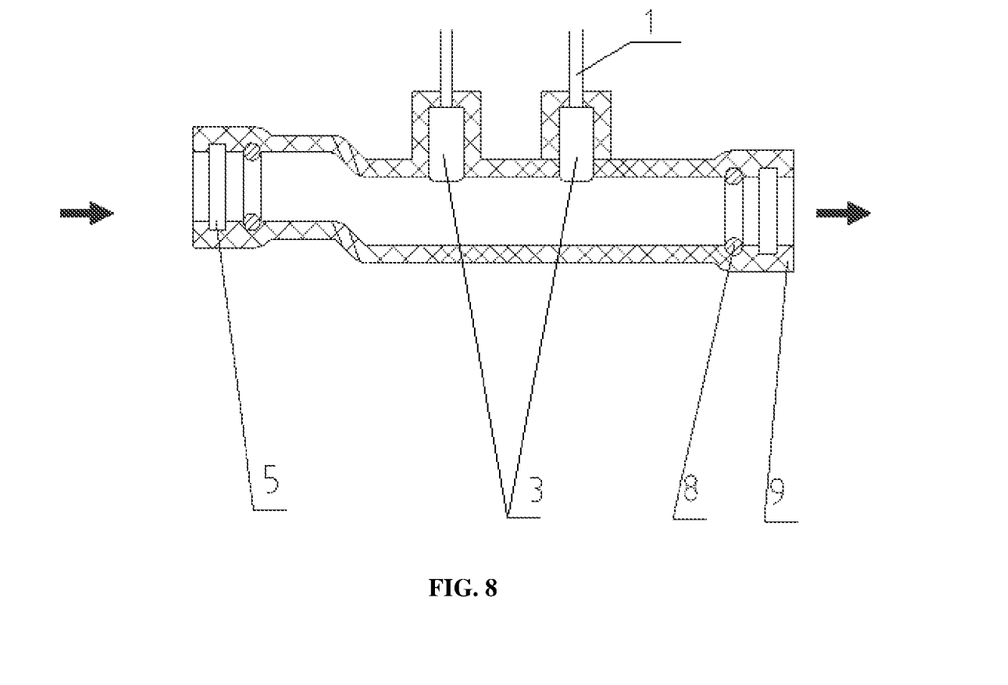
FIG. 8 is a schematic structural diagram of a water quality detection device according to Embodiment 4 of the present application.

The similarities with Embodiment 3 will not be repeated in Embodiment 4. The difference between Embodiment 4 and Embodiment 3 is that in Embodiment 4, as shown in FIG. 8, the electrode pair 3 is arranged on the same side of the connecting pipe section. In this case, the positive electrode and the negative electrode are connected to the external circuit from the same side, thereby facilitating the arrangement of the external circuit. In one case, the positive electrode and the negative electrode of the electrode pair 3 are arranged in parallel. In this case, the structure of the connecting pipe section is more regular, thereby facilitating preparation.

Embodiment 5

Figure 9:
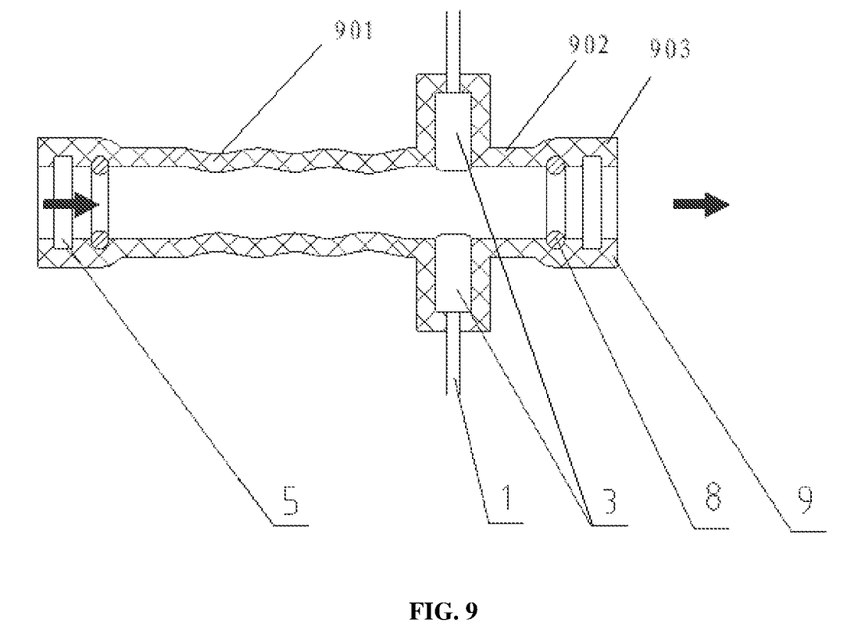
FIG. 9 is a schematic structural diagram of a water quality detection device according to Embodiment 5 of the present application.

The similarities with Embodiment 1 will not be repeated in Embodiment 5. The difference between Embodiment 5 and Embodiment 1 is that in Embodiment 5, in order to make the flow rate in the connecting pipe section 902 greater than that in the water inlet pipe section 901 when the water flow is introduced into the installation pipeline 9, the water inlet pipe section 901 is arranged as a curved pipe section, as shown in FIG. 9. Therefore, even if the water flow carries a small amount of impurities or breeds a small amount of organic matters, the impurities or organic matters will be blocked in the water inlet pipe section, thus avoiding the deposition of organic matters at the water quality detection probe when the water flow passes through the connecting pipe section. Moreover, since the water inlet pipe section is designed as a curved pipe section, the flow rate in the connecting pipe section will be greater than that in the water inlet pipe section, causing the water flow to wash the water quality detection probe, thereby further avoiding the deposition of organic matters at the water quality detection probe.

Embodiment 6

Figure 10:
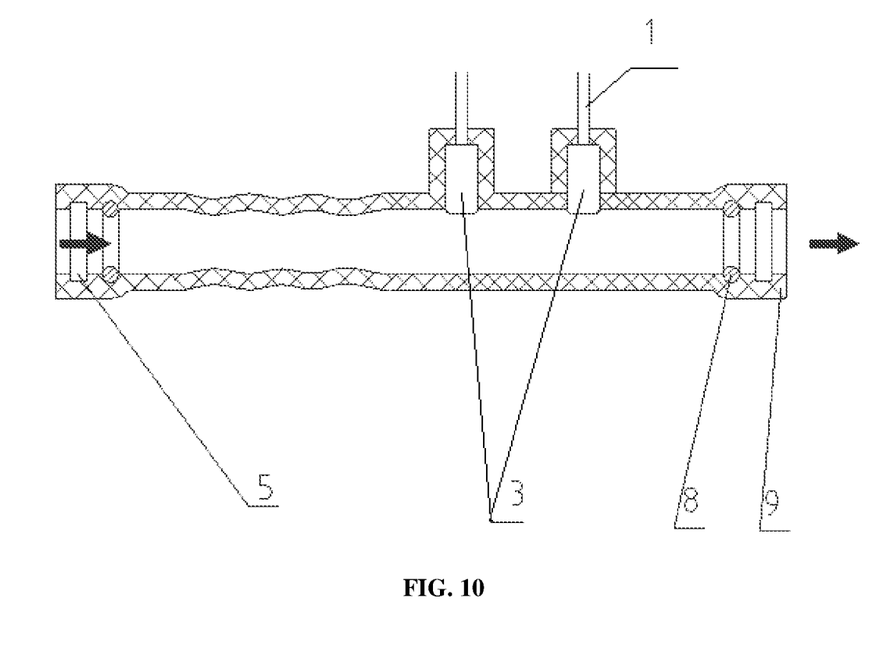
FIG. 10 is a schematic structural diagram of a water quality detection device according to Embodiment 6 of the present application.

The similarities with Embodiment 5 will not be repeated in Embodiment 6. The difference between Embodiment 6 and Embodiment 5 is that in Embodiment 6, as shown in FIG. 10, the electrode pair 3 is arranged on the same side of the connecting pipe section. In this case, the positive electrode and the negative electrode are connected to the external circuit from the same side, thereby facilitating the arrangement of the external circuit. In one case, the positive electrode and the negative electrode of the electrode pair 3 are arranged in parallel. In this case, the structure of the connecting pipe section is more regular, thereby facilitating preparation.

Of course, when the water quality detection probe is the electrode pair 3, the specific arrangement of the electrode pair 3 is not limited by Embodiment 1 to Embodiment 6, as long as the arrangement of the electrode pair 3 meets the requirements for water quality detection.

Moreover, in addition to using the form of electrode pair 3, the water quality detection probe may also be in any form disclosed in the prior art. For example, the water quality detection probe may also adopt the form of a laser light source and a receiving screen, wherein the suspended solids content in the water may be detected through the laser light source and the receiving screen. Alternatively, the water quality detection probe may also be a magnetic sensitive probe, a thermal sensitive probe, or any other probe that has been disclosed in the prior art.

Moreover, the structure of the installation pipeline 9 of the present application is not limited by the examples in the above embodiments, as long as the water inlet pipe section and the connecting pipe section meet the requirement of "the flow rate in the connecting pipe section is greater than that in the water inlet pipe section when the water flow is introduced into the installation pipeline 9," and the specific structure form is not limited by the above examples.

According to another embodiment of the present application, a refrigeration apparatus is further provided, which includes the above-mentioned water supply system.

The refrigeration apparatus mentioned above may be, but does not have to be, a refrigerator.

In an embodiment, when the refrigeration apparatus is a refrigerator, and the water supply system is a water supply system of the refrigerator, the water container of the water supply system of the refrigerator may be disposed in a compartment of the refrigerator, preferably a refrigerating compartment, which can provide cool drinking water in summer.

Further, the above refrigeration apparatus further includes at least one of a water intake switch, a cleaning switch, and a detection switch, and the at least one of the water intake switch, the cleaning switch, and the detection switch is configured to send a signal to the controller, and the controller is configured to obtain the water quality parameters detected by the water quality detection device based on the signal.

The above embodiments are only used to describe the present application, and are not limited thereto. Although the present application is described in detail with reference to the embodiments, it should be understood by those of ordinary skill in the art that various combinations, modifications or equivalent substitutions of the technical solutions of the present application do not depart from the spirit and scope of the technical solutions of the present application, and thus should be covered by the scope of the claims of the present application.

INDUSTRIAL APPLICABILITY

For the water quality monitoring method for a water supply system, the water supply system and the refrigeration apparatus involved in the present application, the water quality parameter in the water outlet pipe may be monitored in real time through the water quality monitoring method for a water supply system, and it is controlled to drain the water in the water supply system when the water quality parameter exceeds the standard, thereby avoiding the breeding and deposition of organic matters. Moreover, through this water quality monitoring method, drainage and washing of the water supply system after being idle for a long period may be avoided, and thus operational difficulties is reduced and user convenience is improved.

The invention claimed is:

1. A water quality monitoring method for a water supply system, wherein the water supply system comprises:
    a water container, a water inlet pipe connected to the water container and a water outlet pipe connected to the water container, wherein a water inlet valve is disposed on the water inlet pipe, a drain valve and a water quality detection device are disposed on the water outlet pipe, the water quality detection device is connected to a controller, and the controller is configured to control the water inlet valve and the drain valve according to a water quality parameter detected by the water quality detection device;
    the water quality monitoring method comprises:
    a water conveying operation of controlling to convey water from the water container of the water supply system to the water outlet pipe of the water supply system; and
    an iterative procedure of repeating the following actions of:
    detecting that a water level of the water container is maintained at a preset water level;
    an obtaining operation of obtaining the water quality parameter in the water outlet pipe in response to the detecting that the water level of the water container is maintained at the preset water level;
    a judging operation of judging whether the water quality parameter meets a standard; and
    a draining operation of controlling to drain the water in the water supply system in response to the water quality parameter does not meet the standard.

2. The monitoring method of claim 1, further comprising:
before the water conveying operation, obtaining a using water signal, a cleaning signal or a detection signal.

3. The monitoring method of claim 1, further comprising:
before the water conveying operation, counting an actual idle time of the water supply system, and performing the water conveying operation when the actual idle time reaches a preset idle time.

4. The monitoring method of claim 1, wherein the obtaining operation comprises:
detecting the water quality parameter in the water outlet pipe by the water quality detection device disposed in the water outlet pipe.

5. The monitoring method of claim 4, wherein the water quality parameter comprises electric ion concentration;
wherein the judging operation comprises:
comparing an obtained actual electric ion concentration with a preset ion concentration,
in response to the actual electric ion concentration being greater than a preset electric ion concentration, judging that the water quality parameter exceeds the standard; and
in response to the actual electric ion concentration being less than or equal to the preset electric ion concentration, judging that the water quality parameter meets the standard.

6. The monitoring method of claim 1, further comprising:
between the draining operation of an iteration of the iterative procedure and the obtaining operation of a subsequent iteration of the iterative procedure, detecting the water level of the water container in the water supply system; and
in response to the water level of the water container being zero, controlling to inject water into the water supply system and convey the water to the water outlet pipe of the water supply system.

7. The monitoring method of claim 1, further comprising:
between the draining operation of an iteration of the iterative procedure and the obtaining operation of a subsequent iteration of the iterative procedure, controlling to inject water into the water supply system so that the water level of the water container of the water supply system is maintained at the preset water level.

8. The monitoring method of claim 1, wherein the draining operation comprises:
controlling to drain the water in the water supply system until the water in the water supply system is drained completely,
wherein the iterative procedure is terminated in response to the water quality parameter meeting the standard before the water in the water supply system is drained completely.

9. The monitoring method of claim 1, further comprising:
after the iterative procedure, controlling to inject water into the water supply system until an actual water level of a water container in the water supply system reaches the preset water level.

10. The monitoring method of claim 9, wherein the controlling to inject water into the water supply system until the actual water level of the water container in the water supply system reaches the preset water level comprises:
detecting the actual water level of the water container in the water supply system, and calculating a water level difference between the actual water level and the preset water level;
calculating a water injection time based on the water level difference; and
opening the water inlet valve of the water supply system to inject water into the water supply system until a duration reaches the water injection time.

11. A water supply system, comprising:
a water container, a water inlet pipe connected to the water container and a water outlet pipe connected to the water container, wherein a water inlet valve is disposed on the water inlet pipe, a drain valve and a water quality detection device are disposed on the water outlet pipe, the water quality detection device is connected to a controller, and the controller is configured to control the water inlet valve and the drain valve according to a water quality parameter detected by the water quality detection device through actions including:
controlling the drain valve to convey water from the water container to the water outlet pipe of the water container;
detecting that a water level of the water container is maintained at a preset water level;
obtaining, through the water quality detection device, a water quality parameter in the water outlet pipe in response to the detecting that the water level of the water container is maintained at the preset water level;
determining whether the water quality parameter meets a standard; and
controlling the drain valve to drain the water in the water container in response to the water quality parameter does not meet the standard.

12. A refrigeration apparatus, comprising a water supply system, the water supply system including a water container, a water inlet pipe connected to the water container and a water outlet pipe connected to the water container, wherein a water inlet valve is disposed on the water inlet pipe, a drain valve and a water quality detection device are disposed on the water outlet pipe, the water quality detection device is connected to a controller, and the controller is configured to control the water inlet valve and the drain valve according to a water quality parameter detected by the water quality detection device through actions including:
controlling the drain valve to convey water from the water container to the water outlet pipe of the water container;
detecting that a water level of the water container is maintained at a preset water level;
obtaining, through the water quality detection device, a water quality parameter in the water outlet pipe in response to the detecting that the water level of the water container is maintained at the preset water level;
determining whether the water quality parameter meets a standard; and
controlling the drain valve to drain the water in the water container in response to the water quality parameter does not meet the standard.

13. The refrigeration apparatus of claim 12, comprising one or more of a water intake switch, a cleaning switch, and the one or more of the detection device, the water intake switch, the cleaning switch, and the detection switch is configured to send a signal to the controller, and the controller obtains the water quality parameter detected by the water quality detection device based on the signal.

* * * * *